Aug. 28, 1962

F. E. AHLBIN 3,051,447

POWER DRIVEN CABLE WINCH AND DRIVE
AND BRAKE MEANS THEREOF

Filed March 2, 1960

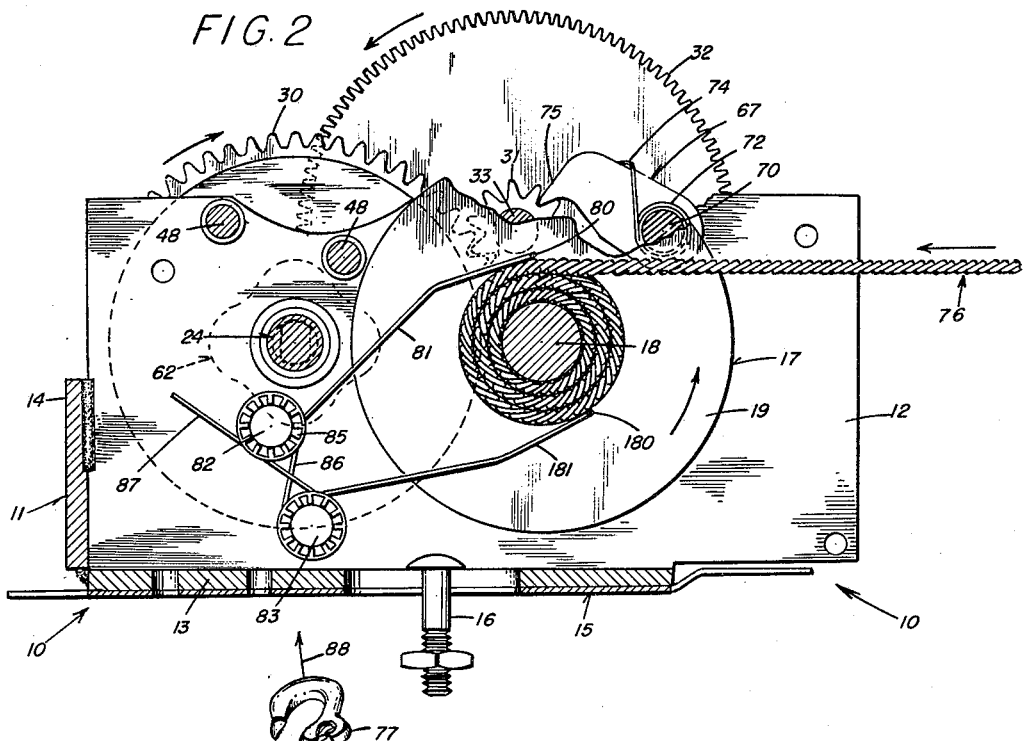

Aug. 28, 1962 F. E. AHLBIN 3,051,447
POWER DRIVEN CABLE WINCH AND DRIVE
AND BRAKE MEANS THEREOF
Filed March 2, 1960 3 Sheets-Sheet 3

United States Patent Office
3,051,447
Patented Aug. 28, 1962

3,051,447
POWER DRIVEN CABLE WINCH AND DRIVE AND
BRAKE MEANS THEREOF
Fred E. Ahlbin, 3663 Congress St., Fairfield, Conn.
Filed Mar. 2, 1960, Ser. No. 12,360
2 Claims. (Cl. 254—187)

The present invention relates to power driven cable winches of the type disclosed in my copending application Serial No. 827,639, filed July 16, 1959, being an improvement thereon with respect to the driving mechanism for rotation of the reel to wind up thereon a loaded length of steel wire cable and as to means to brake the rotation of the reel when undriven and load attached to the cable is payed out.

A general object of the invention is to provide such a power driven reel and the drive and brake mechanism thereof which features a simple but efficient driving friction clutch means that alternately can serve as effective brake means to control speed of the reel as load pull applied to the cable pays the latter out from off of the reel, the device providing a readily accessible manual control which can, during load pay-out of the cable, be instantaneously adjusted in very simple manner to change at will the speed with which the load is permitted to travel away from the winch.

A more specific object of the invention is to provide in such a power driven winch a driving friction clutch effectively suitable alternately to service as a friction brake and having a rotary manual control against which one's fingers may drag to change by the application of slight pressure the adjustment of the drag applied to the reel by the brake and consequential speed of pay out of the load.

Another object of the invention is to provide such rotary manual control in the form of a readily accessible knob which may be rotated manually in a clutch tightening direction to effect reel up of cable on the reel when the knob is so rotated manually, thus permitting readily manual tightening of the cable to hauling condition after attachment thereof to the load before power drive of the winch is effected.

A further object of the invention is to provide a structural embodiment of the power driven winch which is readily constructed, and which permits efficient use and operation thereof by remote control in hauling up a load therewith.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

FIG. 2 is a vertical sectional view to enlarged scale, taken substantially on line 2—2 of FIG. 1, with parts broken away and with the driving motor omitted;

FIG. 3 is a perspective view taken from the rear of the winch shown in FIGS. 1 and 2, with parts broken away and with the motor omitted as in FIG. 2, illustrating a free running condition of a portion of the drive to permit the cable to be freely pulled out from off of the reel for attachment to a load at a remote point;

Figure 1:
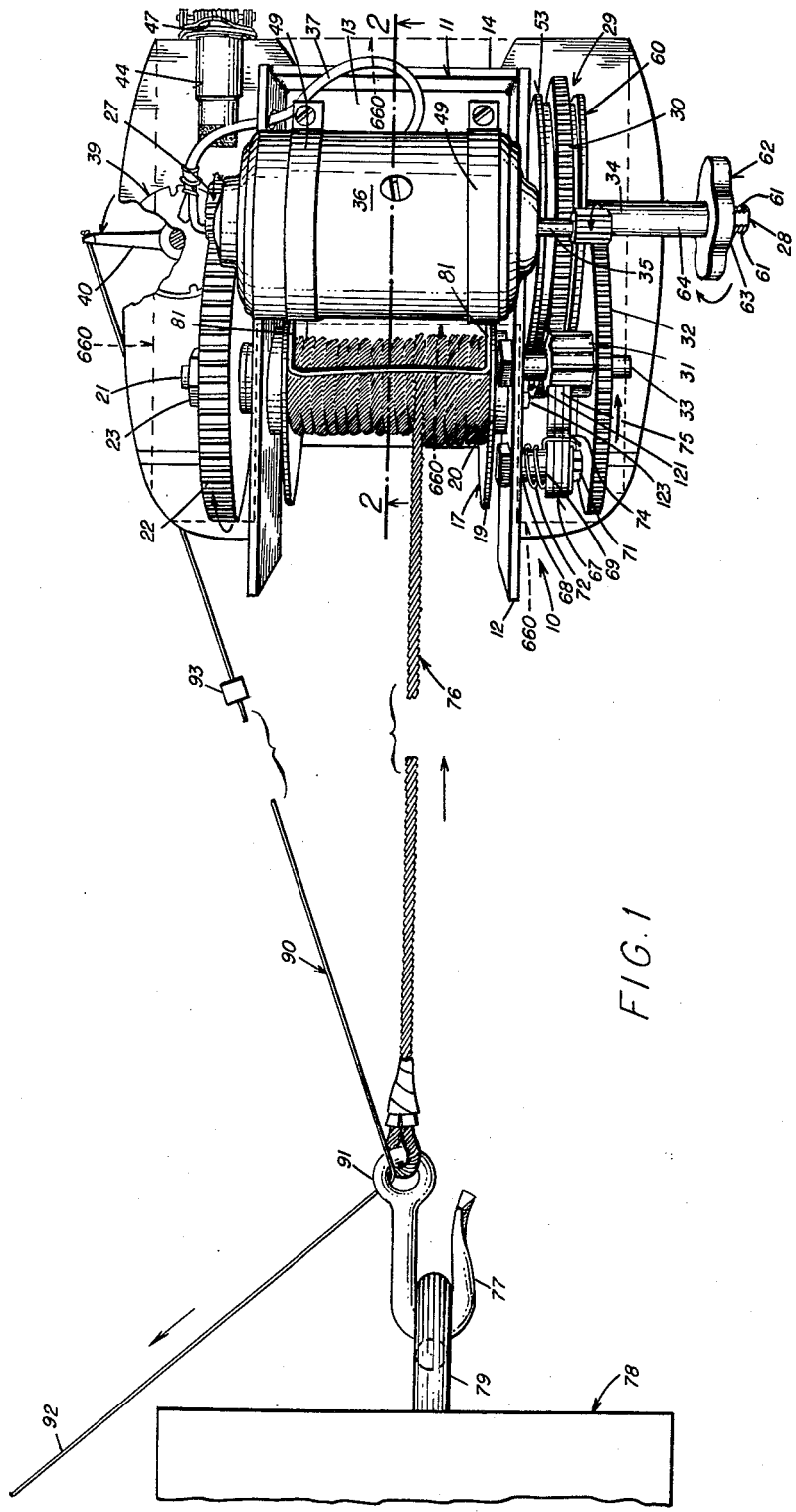
FIG. 1 is a top perspective view of an embodiment of the power driven cable winch of the present invention, with parts broken away, illustrating operation thereof in the hauling thereby of a load which is diagrammatically illustrated therein, a cover hood for the device being indicated in dotted lines.

The present invention provides a small and compact power driven cable winch in which a rotatable cable winding reel of small dimensions is adapted to be driven in one direction to reel up thereon a length of small diameter cable, e.g., seventy-five or one hundred feet (75'–100') of springy steel wire cable of a diameter of the order of five thirty-seconds of an inch (5/32"), attached to a relatively heavy load, which may be of the order of several thousand pounds, to be hauled forward up an inclined way or dragged across terrain. This power driven winch is also adapted to paying out the cable in controlled manner when pull is applied thereto by the load for easing off the latter when the reel is undriven, the reel being connected to the power source by driving means which may be readily disabled by simple manual manipulation in a way to provide braked pay out of the cable, or to provide free run of the cable from the reel to permit ready attachment thereof to a remotely located load. The power source with which the winch is equipped may be any suitable means, such as an electric motor operable from batteries usually present as equipment for other service on jobs for which the present winch is especially designed, the rotor thereof serving as a driving member suitably mechanically coupled to the reel driving means. The winch also is provided with means to prevent reverse rotation of the power source driving member, and which is essential to operation of mechanism in the reel driving means for application of controlled braking drag in paying out a load. The reel driving means includes combined friction clutch and brake means located between the reel and the reverse rotation preventing means, a combined clutch and brake drivable member thereof being connected to the reel to rotate simultaneously with the latter for drive thereof in one direction for hauling in a load and for drive therefrom as a brake member upon reverse load pay-out rotation of the reel. Although a preferred form of the winch employs a pair of such combined clutch and brake drivable members, in its simplest form only one thereof need be provided. The combined friction clutch and brake means also includes a combined clutch driving and fixed brake member connected to the power source driving member to be driven by the latter in one direction as a clutch driving member and alternately held as a fixed brake member against rotation in the reverse direction by the reverse rotation preventing means. The clutch and brake drivable and driving members have opposed engageable friction surfaces normally spaced apart in free running positions of these members. The reel driving means includes transverse shaft means which supports the clutch driving member for free rotation thereon and it has a threaded section extending laterally outward beyond the clutch driving member. The threads of this threaded section are spirally advanced toward the clutch driving member in the direction of reel drive rotation thereof. An accessible rotary manual knob is provided which has an internally-threaded shank threadably engaged on the threaded section of the transverse shaft means with the shank being adapted to apply axial thrust to the clutch driving member to force it to tight driving engagement of its friction surface with the friction surface of the clutch drivable member upon manual rotation of the knob in the direction of reel drive rotation of the clutch driving member and the transverse shaft means. Reverse rotation of the transverse shaft means by the reel upon load pay-out of the cable from the reel causes the manual knob to rotate therewith and when manual drag is lightly applied to the rotating knob the shank of the latter is caused to force the brake fixed member, which alternately was the clutch driving member in the power drive of the reel, to a degree of brake drag engagement of its friction surface with the friction surface of the brake drivable member connected to the reel for drive therefrom, this drivable member alternately having been the clutch drivable member for driving the reel.

By reference to the drawings, in which like numerals identify similar parts throughout, it will be seen that the embodiment of the invention there illustrated includes a suitable base structure 10 consisting of a box frame 11 providing a pair of laterally-spaced, upstanding side walls 12, 12 connected together at their bottom edges by transverse base plate 13 and at the back edges thereof by a transverse back plate 14, suitably secured together at meeting separated edges by welding after the parts have been die cut from relatively thick sheet steel and with the side walls and base plate formed in one piece and then the side wall sections bent up relative to the base plate section. Preferably the base plate rests upon a base pan of relatively thin sheet metal 15 which, as is best seen from FIGS. 1 and 2, is to be anchored with the frame base plate 13 to any suitable supporting structure by any suitable means, such as one or more anchoring bolts, one such bolt being illustrated at 16 in FIG. 2. For example, if the intended service of this power driven cable winch is to haul a boat up an incline out of the water on to a car trailer and to ease it off therefrom into the water, such winch will be mounted by suitable anchoring bolts, such as that illustrated at 16, to the hitch structure at the front end of the main frame of the trailer.

The laterally-spaced side walls 12, 12 of box frame 11 rotatably support therebetween a reel structure 17 consisting of a reel tread or core barrel 18, which may be about an inch (1") in diameter, and longitudinally-spaced, generally radially-extending cable-confining means or end flanges 19, 19. For this purpose, each side wall 12 supports in a hole therein a suitable bearing unit 20 through which end extensions of the reel core barrel rotatably extend with one serving as a driving stub shaft 21.

It will be understood from FIG. 1 that this driving stub shaft extension 21 is located to the left end of the core barrel 18 as viewed from the front of the winch and is reduced in section, receiving thereon, in a fixed manner, a reel-driving bull gear 22. For this purpose, the stub shaft extension 21 may be in conventional manner flatted off with the hole in the bull gear 22 being of complemental shape and held thereon in any suitable manner, such as by a nut 23 threadably engaged with external threads on the stub shaft extension. The right hand end of the core barrel 18 is also provided with a reduced diameter stub shaft 121 which extends through the other bearing 20 and in like manner carries a nut 123 beyond the latter.

A transverse driving shaft 24, best seen in FIGS. 2 and 3, is rotatably supported through bearing units 25, 25 carried by the frame side walls 12, 12, and the left hand end 26 of this transverse driving shaft which extends beyond the left side wall 12 is reduced in section and has fixed thereon a driving pinion 27 meshed with the bull gear 22. Beyond the outside face of the opposite or right side frame wall 12 an extension 28 of the transverse driving shaft 24 carries combined friction clutch and brake means 29, hereinafter more fully described. The combined friction clutch and brake means 29 includes a relatively large spur gear 30 which is meshed with a speed reduction pinion 31 fixedly carried by larger spur gear 32, both rotatably supported upon a stub shaft 33, carried by the right side frame wall 12, for free rotation thereon together. Spur gear 32 is driven by pinion 34 meshed therewith and fixedly mounted upon a shaft 35 driven by the rotor of an electric motor 36 serving as the power source.

Figure 4:
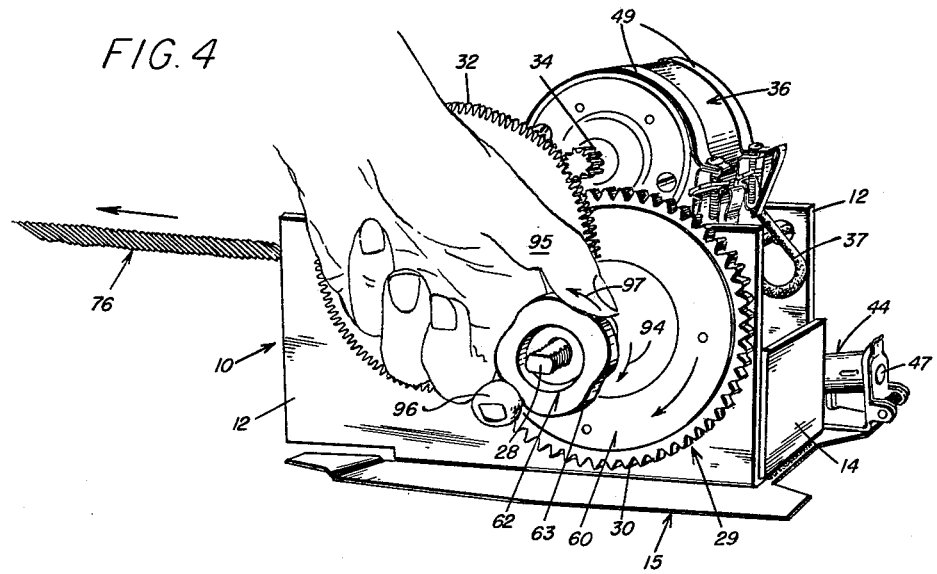
FIG. 4 is a right side perspective view of the winch shown in FIG. 1, illustrating braked pay out of the cable while being subjected to pull of the load as it is eased away from the winch, and depicted manual adjustment of the degree of braking power applied.

The electric motor 36 may be a D.C. motor drivable by power supplied from a twelve volt (12 v.) storage battery that may be part of conventional equipment associated with apparatus on which the present winch is mounted, such as the storage battery of the electrical equipment of a truck when the winch is mounted upon the truck body for various hauling services and the storage battery of the electrical circuit of an automobile when a boat trailer is hitched thereto and the trailer hitch at its front end is equipped with such winch to handle the boat transported by the trailer. One side of the electrical supply circuit of the electric motor 36 is grounded in conventional manner and the other side is connected by conductor 37 to one terminal 38 of a circuit closing switch 39 which is spring biased to circuit-open position and provided with a rotary arm 40 (FIG. 1) which may be pulled forward against the biasing force of the spring to circuit-closing position. As will be seen in FIG. 3, the other terminal 41 of switch 39 is connected by conductor 42 to one terminal 43 of a receptive socket 44 for a twin-pin connector mounted upon a two-wire cable leading from the battery. The other terminal of the receptive socket 44 is connected by conductor 45 to a ground point 46. For protective purposes the mouth of the receptive socket 44 is closed temporarily by a spring-biased flap or door 47. As will be understood from and seen in FIGS. 2 and 3, the frame side walls 12, 12 are transversely tied together by a pair of tie rods 48, 48, beneath which are lapped anchoring straps 49, 49 (see FIGS. 1 and 4) looped about the motor 36 and securely anchoring the latter in fixed position as it is cradled on these tie rods.

Figure 5:
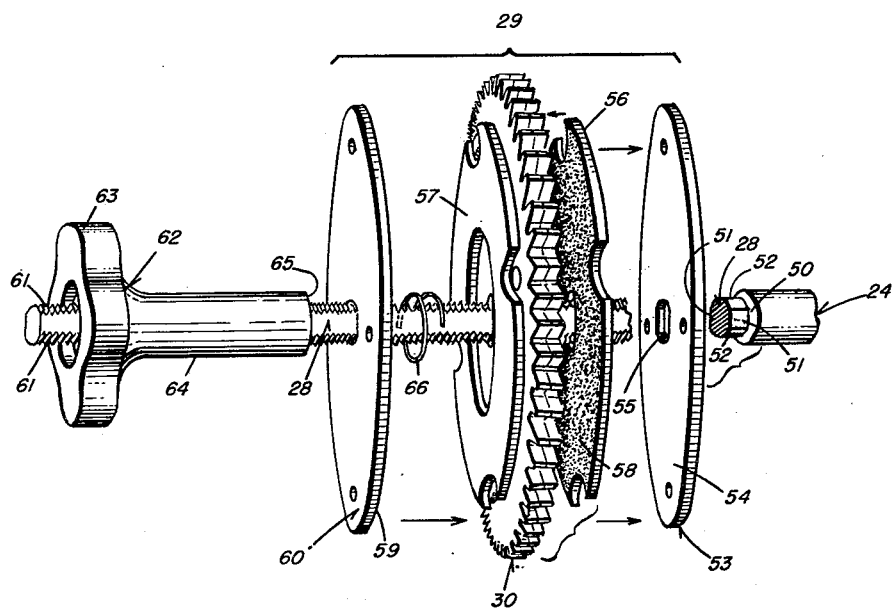
FIG. 5 is an exploded perspective view of the parts of the combined friction clutch and brake means employed in the winch drive.

The combined friction clutch and brake means 29 includes the extension 28 of the transverse driving shaft 24 which, as will be seen from FIG. 5, is reduced in diameter to provide an annular shoulder 50 and is flatted off at 51 on opposite sides to define therebetween arcuate surfaces 52, 52 upon which the free running spur gear 30 is rotatably supported. The transverse shaft extension 28 slidably receives between the annular shoulder 50 and the spur gear 30 a combined clutch and brake drivable member 53 in the form of a circular plate having a friction surface or radial face 54 and a central hole 55 which is shaped complementary to the cross-section of the transverse shaft extension 28 for slidable fit on the latter for rotation therewith, either to drive it in the drive of the reel or to be driven by it from the reel alternately. The free running spur gear 30 constitutes the other combined clutch and brake member to serve as a clutch driving member and alternately to be held as a fixed brake member against rotation in the reverse direction. The central hole in gear 30 is cylindrical so as to rotate freely on the arcuate surfaces 52, 52 of the transverse shaft extension 28. Preferably opposite side faces of the spur gear 30 are equipped with facings 56 and 57 of suitable and conventional friction clutch composition, held in fixed position by interposed cement, such as that indicated at 58 in FIG. 5. It will be understood, however, that such an interposed disk of friction clutch composition may be mounted or cemented to the opposed friction surface, such as the side face 54 of the combined clutch and brake drivable disk 53.

It will be understood further that for both clutch and brake service the combined friction clutch and brake means 29 need include only one combined clutch and brake drivable member, such as disk 53, and a single cooperative clutch member to serve as a clutch driving member and alternately when held to serve as a fixed brake member, such as free running gear 30. However, the effectiveness of the clutching and the braking action can be increased considerably in a very simple manner by providing dual pairs of clutch and brake members.

For this purpose, the face of gear 30 opposite to that which is opposed to disk 53 is also employed as a friction surface, preferably fitted with disk 57 of friction composition opposed to friction surface or radial face 59 of another disk 60 like disk 53. In the event that the second disk 60 is omitted, the means for snugging together by axial motion the pair of combined clutch and brake members 53 and 30 will act directly against the latter, but when two pairs of such members are provided by employing the two disks 53 and 60, such pressure control means will act against the second disk 60.

As will be understood from FIG. 5, the means for snugging the combined clutch and brake members together for frictional engagement preferably is in the form of arcuate sections 61, 61 of male threads provided on continuations of the arcuate surfaces 52, 52 of shaft extension 28 outboard of the hub of gear 30. Such male threads are left handed as viewed from the outboard end of transverse shaft extension 28 or the left side of FIG. 5. An accessible rotary manual knob 62 is provided which has an enlarged finger-engageable head 63 and in internally-threaded shank, preferably in the form of an elongated tube 64 fixed to this head, provided internally with left handed female threads to engage with the male threads of the threaded sections 61, 61 of transverse shaft extension 28. Thus, when the rotary manual knob 62 is rotated counterclockwise as viewed from the outboard end of transverse shaft extension 28, the inner end 65 of its shank will apply inward axial thrust against the outboard disk 60 to cause it to slide forward or inward to engagement of its inner surface 59 with the outboard side of free running gear 30, or the facing of friction composition 57 on the latter, so as to apply axial thrust to this gear and force it inwardly to face engagement of its inboard surface or facing of friction composition 56 thereon with the outboard side surface 54 of the inboard disk 53. In this manner, the mechanism 29 illustrated in FIG. 5 will be tightened up to serve either as a friction clutch or as a brake.

It is desirable to maintain the freely running gear 30 in close adjacency to the inboard disk 53 even when the combined clutch and brake means 29 is loosened up appreciably for substantially free paying out of the cable so as to limit the necessary axial travel of the gear relative to the inboard disk to attain full gripping on clutch drive and adjusted drag on controlled braking and apply minor drag on the reel drive to prevent cable backlash. This is assured by the employment of a compression spring 66 having one or more turns encircling the transverse shaft extension 28 between the outboard face of gear 30 and the thrust applying means, whether the latter be the inboard end 65 of the knob shank 64, when only a pair of clutch members are employed, or the inboard face 59 of the second disk 60 when two pairs of clutch members are employed, as is preferred. Also, such biasing spring 66 tends to limit the axial outward position of the gear 30 when the manual knob 62 is backed off appreciably so as to assure that this gear will be maintained in mesh with its driving pinion 31. However, since the gear 32 which carries pinion 31 laps the outboard side face of the second disk 60, as will be understood from FIGS. 1, 2 and 4, such axial outward movement of both the gear and the outboard disk is limited thereby even though the manual knob 62 be backed off appreciably or entirely from the transverse shaft extension 28, this relationship also assuring maintenance of mesh between the free running gear 30 and its driving pinion 31.

Preferably, the embodiment of the winch illustrated in the drawings is to be provided with a suitable covering hood to serve as some protection for the mechanism and also to assure that the operator's clothing or other fouling members, such as lines, bush branches, the trip cord, etc., will not get caught in the rotating gearing. Such a covering hood structure is suggested in dotted lines at 660 in FIG. 1 which rests down over the motor and gearing upon the base pan 15 and cooperates with the frame side walls 12, 12 so as to leave exposed at the front of the winch the cable winding reel 17, the front wall of the hood being cut away between the frame side walls for this purpose. It will thus be understood from FIG. 1 that the elongated tubular shank 64 of the manual knob 62 extends through a hole in the side of such hood structure 660, so that the knob head 63 is always readily accessible outside thereof.

It is necessary to provide means for preventing reverse rotation of the power source driving member, i.e., the rotor of motor 36, or at least one member of the train of gears preceding the free running gear 30, so that the latter may serve for braking action as a fixed brake member. For this purpose there is preferably provided a spring-biased click dog 67 pivotally mounted on or carried by a stub shaft 68 supported by the right side frame wall 12, which is adjacent the combined clutch and brake means 29. The outboard end of stub shaft 68 is reduced in diameter to provide shoulder 69 (FIG. 1) and a reduced end section 70 (FIG. 2) with the latter extending through, in relative rotating manner, a hole in the click 67. The outer end of stub shaft end section 70 is provided with external threads upon which are engaged a nut 71, so that the click dog 67 will be confined in pivoted manner between it and the annular shoulder 69 in alignment with pinion 31. A biasing spring 72 has a number of turns arranged around the stub shaft 68 with one end 73 thereof fixed to the adjacent frame side wall 12 and the other end 74 hooked up over the top of the click dog 67. As will be seen from FIGS. 1, 2 and 3, the click dog 67 has a nose 75 which engages between successive teeth of pinion 31 to prevent it from rotating in a clockwise direction as viewed in FIG. 2. Thus, the driving pinion 31 may be rotated counterclockwise as viewed in FIG. 2 to drive the free running gear 30 in clockwise direction, but the latter is locked against counterclockwise rotation by the click dog 67 so that it may serve as a fixed brake member. Since gear 32 is fixed to driving pinion 31 and in turn is meshed with the driving pinion 34 on the motor rotor shaft 35, these elements are also prevented from rotating in reverse directions.

A suitable length, such as seventy-five or one hundred feet (75'–100') of wire rope or steel wire cable, indicated at 76, has one end suitably anchored to the reel tread or core barrel 18 with turns thereof wound about the latter between reel end flanges 19, 19. The other free end of the cable 76 is provided with suitable engaging means, such as hook 77 illustrated in FIGS. 1 and 3, for connection to the load. For this purpose, the load, diagrammatically illustrated at 78 in FIG. 1, may be provided with an eye bolt 79 into which the hook 77 may be hooked. With the reel 17 is associated a level winding mechanism of the type disclosed and claimed in my above identified copending application Serial No. 827,639. This unique cable guiding and level winding means is provided in order to assure that the successive turns in each course or layer of the cable 76 are laid down neatly about the reel tread or core barrel 18 in adjacent orderly fashion and that these turns are confined snugly to the reel so that the inherent tendency to spring out or "clock spring" is overcome when the reel is undriven and no drag is applied to the cable. Such cable guiding and level winding means is in the form of an elongated, flexible, rod-like, generally straight, cable turn-engaging spring element 80 extending longitudinally of and above the core barrel 18 between the reel end flanges 19, 19. A pair of longitudinally-spaced, transversely-extending spring-biasing support arms 81, 81 support the cable turn-engaging spring element 80 with one end of each arm mounted to one end of the spring element, such as by being made integral therewith when such structure is formed from a length of spring steel wire, as is preferred. As will be understood from FIGS. 2 and 3, each frame side wall 12 carries on its inner face a pair of laterally-extending pins or studs 82 and 83. About each pin 82 are arranged a few turns 84 of one of the spring wire support arms 81 and these are held thereon by a conventional spring tension washer fastener 85 with the terminal end 86 of the wire arm therebeyond being lapped against the back side of near pin or stud 83. As a result, the side spring arms 81, 81 bias and hold the cable turn-engaging spring element 80 snugly down against the top side of the core barrel 18 and any cable turns laid down thereon to bias the last turn as it is being laid down both radially inward toward the axis of the reel 17 and laterally against the preceding cable turn which was laid down immediately therebefore.

It will also be seen from FIGS. 2 and 3 that such cable turn biasing structure preferably is substantially duplicated to the underside of the reel 17 with its longitudinally-extended spring element 180 carried by laterally-spaced integral spring arms 181, 181. Spring arms 181, 181 have a few turns 184, 184 thereof arranged about the pins or studs 83, 83 and held thereon by similar spring tension washer fasteners 85, 85. The free or terminal ends 87, 87 beyond the turns 184, 184 of the lower spring arms 181, 181 extend upwardly to lap behind the near pins or studs 82, 82, so as to bias the longitudinally-extending spring element 180 up against the cable turns on the reel 17 to the underside of the reel core barrel 18.

In use of the power winch illustrated in the drawings, let it be assumed that the load, diagrammatically indicated at 78 in FIG. 1, is a boat to be hauled out of the water up an inclined way provided at least in part by the frame of the trailer on which it is to be loaded for transportation. The manual knob 62 of the combined clutch and brake mechanism will be backed off manually so that the outboard disk 60 will be appreciably separated from the gear 30 by the freed spring 66 and with the inside face of the gear only lightly engaging the opposed side face of the inboard disk 53, as is indicated in FIG. 3. The click dog 67 will prevent the intermediate gear 30 from rotating while permitting the disks 53 and 60 and the transverse shaft 24 on which they are fixed to rotate relatively freely with the application thereto of only slight drag created between the inboard disk 53 and the intermediate gear.

In order to avoid backlash of outside turns of the cable 76 upon the reel 17 and of the latter when it is undriven and freed to an appreciable degree to permit pay out of the cable therefrom for connecting to a load at a remote point, the slight drag applied to the reel drive by the axial biasing of the gear 30, imposed on the latter by the spring 66 so that its inboard friction surface lightly engages the outboard face 54 of the inboard disk 53, cooperates in an advantageous manner with the level winding mechanism comprising the elongated spring elements 80 and 180 which firmly engage the outside cable turns on the reel core barrel 18. For these turns to loosen up and "clock spring" between the points of contact by the longitudinal spring elements 80 and 180 of the level winding mechanism the reel 17 must be permitted to rotate slightly in reverse direction. This slight drag between the gear 30 and the inboard disk 53 prevents such slight reverse rotation of the reel 17 under the spring action of the cable turns on the latter when the front end of the cable is free, i.e., not under pull during pay out or not attached to the load for reeling. The biasing force of the spring 66 determines the degree of this slight drag so as to assure that it will be sufficient to prevent backlash without being great enough materially to interfere with forward rotation of the reel 17 when pull is applied to the front end of the cable to pull it off of the reel for connection to the load at a remote point.

Consequently, the reel 17 will be allowed to rotate freely enough as to permit one easily to pull the hook 77 forward in the direction of the arrow 88 in FIG. 3, so as to allow the hook to be engaged into the eye 79 anchored to the front end of the boat, constituting load 78. In order to so loosen the elements of the combined clutch and brake mechanism 29, the operator rotated the manual knob 62 in a clockwise direction as viewed from the outboard end of the transverse shaft end section 28, such as in the direction of the arrow 89 in FIG. 3. This manual knob 62 in such backed-off position is then rotated with the transverse shaft 24 in this same direction as the cable 76 is pulled forward off of the reel 17. After engaging the hook 77 into the eye bolt 79 anchored to the load 78, the operator will then tighten up the driving clutch mechanism 29 by rotating the manual knob 62 in the opposite direction, so as to cause the knob shank 64 to force the outboard disk 60 and the intermediate gear 30 axially inward to snug face engagement of opposite sides of the gear by the opposed faces 54 and 59 of the inboard disk 53 and outboard disk 60. The clutch driving mechanism 29 is then in reel driving condition.

Let it be assumed that the operator has flipped the flap 47 downwardly and plugged into receptive connector 44 the twin-pin connector of a supply cable leading from the battery of the automobile which is to tow the trailer with the boat loaded thereon. The operator may then cause the motor 36 to run for reeling operation by closing the switch 39, which he may do by reaching beneath the base pan 15 and pushing the switch operator arm 40 forward. The operator may wish to observe at close range the progress of the hauling of the load or boat. For this purpose, he may employ a trip line or cord 90, illustrated in FIG. 1, which is tied at its back end to the switch operating arm 40, and he may thread the front end of the cord through the eye 91 of the hook for remote control purposes and then apply pull to the trip cord front end 92 as it extends alongside the bow of the boat. In this manner the operator remotely closes the motor supply circuit switch 39 so as to rotate the driving pinion 34 for driving the train of gears 32, 31 and 30. Since intermediate gear 30 is clamped tightly between the clutch disks 53 and 60, which in turn are fixed upon the transverse shaft 24, the latter is caused to be rotated in a clockwise direction as viewed from its end opposite to that on which the manual knob 62 is carried. Bull gear 22, which is meshed with driving pinion 27 fixed on transverse shaft 24, is thus rotated in a counterclockwise direction as viewed from the outboard side thereof, so as to rotate the reel 17 backward in the same direction for winding up on the core barrel 18 of the latter the cable 76, hauling the load or boat 78 forward. The forward progress of the load or boat 78 may be stopped at any instant by releasing the pull on the trip cord 90, permitting the circuit switch 39 to be spring biased to open position. Assuming continued hauling progress of the load or boat 78 as the latter approaches the winch, it may be automatically stopped at a predetermined short distance in front of the winch, such as after it has been properly pulled up on and loaded upon the trailer. This automatic stopping of the haulling action may be accomplished by providing the trip cord 90 with an abutment 93, such as in the form of a clamp on or knots formed in the cord, so that this abutment, as the cord is running through the eye 91 of moving hook 77, will eventually engage the hook eye, and then, as the hook is hauled farther back, the section of the cord between the abutment and the switch arm 40 will be slacked off, thereby permitting the circuit switch 39 to be spring biased to circuit open position, thus stopping the hauling action.

The operator may pay out the load 78 from away from the winch by permitting it to slide down an inclined way provided in part by the tilted trailer bed. In order to do this he maintains the de-energized condition of the motor 36, such as by leaving the supply circuit open at the switch 39. With the cable 76 suitably attached to the load 78 by its hook 77 the operator backs off the manual knob 62 slightly by rotating it to a limited extent clockwise as viewed from its outboard end or as it is viewed in FIG. 4. Since the motor 36 is de-energized, the click dog 67 locks the driving pinion 31 to hold in fixed position the intermediate gear 30 so that it will constitute a fixed brake member. The backing off of the manual knob 62 slightly decreases the force of the engagement of the friction faces 54 and 59 of the inboard and outboard disks 53 and 60 with the opposed side faces of the intermediate fixed gear 30 or the friction facings 56 and 57 mounted thereon. Some drag is developed at these opposed faces since the control knob 62 has not been backed off sufficiently to free to the greatest degree possible the members of the mechanism 29 now serving as a brake, and the load will thus be permitted to apply such pull upon the cable 76 as to pay out the load slowly. During this pay out of the load, the control knob 62 will be rotating with the transverse shaft extension 28 in the clockwise direction as viewed from its outboard end, such as in the direction of the arrow 94 in FIG. 4. The operator will hold his thumb 95 and finger 96 loosely about the head 63 of the control knob, letting it rotate clockwise in the direction of the arrow 94 with the transverse shaft. Consequently, should the load begin to travel away from the winch at a too rapid pace, it can easily be slowed up by tightening up the brake mechanism 29 slightly. This is done by merely increasing the grasping force which is applied with thumb 95 and finger 96 to the control knob 63 as it is rotating therebetween. The drag developed by this tightened grasp, indicated by the arrow 97 in FIG. 4, causes the control knob 62 to be threaded forward upon the transverse shaft extension 28 so as to increase the clamping together of the disks 53 and 60 against the opposite side faces of the intermediate fixed gear member 30, thereby increasing the braking action. The operator thus has constant touch control over the amount of braking force applied to the reel 17 as the cable 76 is payed off therefrom by pull of the load thereon and he can instantly stop the slide of the load 78 from away from the winch by grasp of the control knob head 63 firmly to stop its rotation, causing the brake members to be clamped quickly and firmly against each other.

Another advantage which is provided by this combined driving clutch and brake mechanism 29 resides in the fact that when the control knob 62 is backed off to free the gear 30 between the disks 53 and 60 substantially the operator may, after pulling the cable 76 out off of the reel 17 until he can hook the hook 77 into the bolt eye 79 anchored to the load 78, easily take out cable slack manually. Considerable slack may have developed in the section of the cable forward of the winch in so fastening its front end to the load. It is desirable that such slack in the cable 76 be eliminated so that when drive of the winch reel 17 by the motor 36 is started for hauling in the load, the cable will not be snapped and the load jerked as such slack is pulled out of the cable. Before the operator starts the power drive of the winch he will, of course, rotate the control knob 62 to tighten up the clutch mechanism 29 for drive of the reel 17 by the motor 36. When he has tightened up the clutch mechanism 29 by the control knob 62 he continues to rotate the head 63 of the latter manually in the same direction so that he will drive thereby the transverse drive shaft 24, its pinion 27, the bull gear 22 and the reel 17, so as manually to reel up on the core barrel 18 of the latter an amount of the cable 76 which takes the slack out of its forward section and stretches it tightly between the load and the reel. Then the operator may close the motor circuit at switch 39 to effect hauling of the load 78 by the winch without any tendency for the cable to be snapped and the load jerked as hauling force is applied to the load by the power drive of the winch.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In a power driven cable winch driving means comprising, in combination, a train of spur gears coupling a power source to a small cable reel for reeling on the latter a springy wire cable, a spring-biased click dog engaging one of said spur gears to permit rotation thereof in only one direction for cable reeling drive of the reel, a transverse drive shaft independent of the reel and inserted in said gear train following said spur gear engaged by said dog and ahead of the reel with said train including gearing for drivably connecting the reel to said shaft, said transverse shaft having an outer end section, combined clutch and brake means mounted on said transverse shaft having a first inner friction disk fixed on the latter and a second outer friction disk slidably carried by the outer end section of said shaft for axial translation thereon, means preventing relative rotation between said shaft section and said second disk, a spur gear of said train mounted for free rotation on said shaft between and intermediate of said disks with opposite side faces thereof opposed to faces of said disks for engagement by the latter to provide alternately a friction clutch and a drag brake, a compression spring carried by said shaft section between said intermediate gear and said second disk biasing said intermediate gear with limited pressure against said first disk when said second disk is freed from contact with said intermediate gear to eliminate cable backlash while permitting relative rotation by pull of the cable when the latter is appreciably loaded, said outer shaft section being threaded with the threads being spirally advanced toward said second disk in the direction of rotation of said shaft for cable reeling drive of the reel, and an accessible rotary manual knob having an internally-threaded shank threadably engaged on the outer end of said shaft threaded section beyond said second disk for forcing the latter and said intermediate gear axially toward said first disk to cooperative adjusted frictional engagement between said first disk and said intermediate gear and between the latter and said second disk with compression of said spring when said knob is screwed forward on said shaft threaded section either by manual knob rotation when the reel is idle or by application of manual drag to said knob while the latter is rotating with said shaft upon load pay-out of the cable from the reel.

2. In a power driven cable winch the combination with a small rotatable cable winding reel including a core shaft adapted to be driven in one direction to reel up thereon a length of springy wire cable and to rotate in the reverse direction to pay out a load attached to the cable, a controlled power source capable of alternate power drive in one direction and free running in power-off condition having a driving member for driving said reel shaft in a cable-reeling direction at will, driving means drivably connecting said power source driving member to said reel shaft, and means preventing free running reverse rotation of said power source driving member when the power is off; of a transverse shaft separate and distinct from the reel shaft and located in said driving means, said transverse shaft being geared to said reel shaft to rotate simultaneously therewith for drive of said reel shaft therefrom in a cable-reeling direction and for drive thereof by said reel shaft in the opposite direction upon reverse load pay-out rotation of the latter, a combined friction clutch and brake means constituting a part of said driving means and located between said reel shaft and said reverse rotation preventing means, said friction clutch and brake means including a combined clutch and brake drivable disk coaxially mounted on and keyed thereto for rotation therewith at all times and a combined clutch driving and fixed brake member in the form of a spur gear coaxially mounted for free relative rotation and axial sliding motion on said transverse shaft with said gear being permanently geared to said power source driving member to be driven as a clutch driving member by the latter in a cable-reeling direction and alternately held as a fixed brake member against rotation in the reverse direction by said reverse rotation preventing means when said power source driving member is not power driven, said disk and spur gear having opposed side surfaces engageable as cooperative friction surfaces by axial sliding motion of said gear on said transverse shaft, yieldable biasing means normally biasing said opposed engageable side surfaces together with limited pressure to apply a relatively small amount of friction drag therebetween to eliminate cable backlash while permitting relative rotation by relatively heavy load pull applied to the cable, said transverse shaft having a threaded end section laterally outward of said combined friction clutch and brake means with the threads thereof being spirally advanced toward the latter in the direction of reel drive rotation of said transverse shaft, and an accessible rotary manual knob having an internally-threaded shank threadably engaged on said shaft threaded section with said shank adapted to apply relative axial thrust to said disk and spur gear in the same direction of the application of the biasing force by said yieldable biasing means to force them with relatively greater pressure coaxially together to tight driving engagement of their opposed friction side surfaces upon manual rotation of said knob in the direction of reel drive rotation of said transverse shaft, said knob being capable of being manually backed off to a limited degree to lessen the tight engagement between said disk and spur gear to permit a controlled degree of relative rotation with application of an adjusted amount of brake drag upon load pay-out of the cable from said reel with accompanying reverse rotation of said transverse shaft causing said knob to rotate therewith, said rotating knob being slidably engageable manually by the operator's hand to apply manual drag to said rotating knob to cause its shank to apply adjusted greater relative axial thrust to said disk and spur gear again to increase to a controlled degree the clamping force applied to said opposed friction side surfaces in supplement to that provided by said yieldable biasing means so as to adjust the force of brake drag engagement between said friction surfaces.

References Cited in the file of this patent
UNITED STATES PATENTS

| | | |
|---|---|---|
| 700,678 | Downie | May 20, 1902 |
| 1,406,570 | Mace | Feb. 14, 1922 |
| 2,561,138 | Sasgen | July 17, 1951 |

UNITED STATES PATENT OFFICE
CERTIFICATE OF CORRECTION

Patent No. 3,051,447            August 28, 1962

Fred E. Ahlbin

It is hereby certified that error appears in the above numbered patent requiring correction and that the said Letters Patent should read as corrected below.

Column 2, line 4, for "depicted" read -- depicting --; column 4, line 11, after "hitch" insert -- structure --; column 5, line 35, after "inboard" insert -- side --; column 7, line 18, for "-extended" read -- -extending --; column 8, line 61, for "haulling" read -- hauling --; column 11, lines 30 and 31, for "lateally" read -- laterally --.

Signed and sealed this 1st day of January 1963.

(SEAL)
Attest:

ERNEST W. SWIDER
Attesting Officer

DAVID L. LADD
Commissioner of Patents